(12) United States Patent
Steffie et al.

(10) Patent No.: US 7,446,486 B2
(45) Date of Patent: Nov. 4, 2008

(54) HIGH EFFICIENCY OFF-LINE LINEAR POWER SUPPLY

(75) Inventors: Jamie J Steffie, Slatington, PA (US); Richard L Black, Gilbertsville, PA (US)

(73) Assignee: Lutron Electronics Co., Ltd., Coopersburg, PA (US)

( * ) Notice: Subject to any disclaimer, the term of this patent is extended or adjusted under 35 U.S.C. 154(b) by 40 days.

(21) Appl. No.: 11/474,713

(22) Filed: Jun. 26, 2006

(65) Prior Publication Data

US 2006/0238139 A1 Oct. 26, 2006

Related U.S. Application Data

(62) Division of application No. 10/458,608, filed on Jun. 10, 2003, now Pat. No. 7,091,672.

(51) Int. Cl.
*H05B 37/03* (2006.01)

(52) U.S. Cl. .................. 315/291; 315/194; 315/DIG. 4

(58) Field of Classification Search ............. 315/194, 315/291, 224, 307, DIG. 4, 209 SC; 323/300, 323/320, 237; 363/118
See application file for complete search history.

(56) References Cited

U.S. PATENT DOCUMENTS

| | | | |
|---|---|---|---|
| 2,810,105 A | 10/1957 | Henrich | |
| 3,068,392 A | 12/1962 | Santelmann, Jr. | |
| 3,373,344 A | 3/1968 | Seer, Jr. | |
| 3,460,023 A | 8/1969 | Becker | |
| 3,581,187 A | 5/1971 | Grady, Jr. | |
| 4,001,668 A | 1/1977 | Lewis | |
| 4,430,608 A | 2/1984 | Nesler | |
| 4,521,725 A | 6/1985 | Phaneuf | |
| 4,553,082 A | 11/1985 | Nesler | |
| 4,580,090 A | 4/1986 | Bailey et al. | |
| 4,685,046 A | 8/1987 | Sanders | |
| 4,733,159 A | 3/1988 | Edwards et al. | |
| 4,864,482 A | 9/1989 | Quazi et al. | |
| 5,105,144 A | 4/1992 | Trump | |
| 5,307,257 A | 4/1994 | Fukushima | |

(Continued)

FOREIGN PATENT DOCUMENTS

JP 57-90722 6/1982

(Continued)

*Primary Examiner*—Douglas W. Owens
*Assistant Examiner*—Ephrem Alemu
(74) *Attorney, Agent, or Firm*—Ostrolenk, Faber, Gerb & Soffen, LLP

(57) ABSTRACT

A method of providing power to an electronic circuit in a two wire dimmer connecting a hot line of an AC network to a lamp load, the method comprising obtaining power from the two wire dimmer during regions of an AC waveform formed across a portion of a circuit of the dimmer when a phase cut switching device of the dimmer providing power to the lamp load is substantially off; driving a switching device providing charging current to a charge storage capacitor on in a saturated region of operation of the switching device when a voltage from a voltage source developed in the dimmer from the AC waveform is less than a predetermined level, and turning the switching device off when the voltage is above the predetermined level; and providing a voltage across the charge storage device as an output voltage.

15 Claims, 7 Drawing Sheets

U.S. PATENT DOCUMENTS

| | | | |
|---|---|---|---|
| 5,469,046 A | 11/1995 | Wong et al. | |
| 5,500,575 A | 3/1996 | Ionescu | |
| 5,646,514 A | 7/1997 | Tsunetsugu | |
| 5,652,825 A | 7/1997 | Schmider et al. | |
| 5,773,965 A | 6/1998 | Hayashi | |
| 5,801,933 A | 9/1998 | Ravid | |
| 5,818,708 A | 10/1998 | Wong | |
| 5,920,183 A | 7/1999 | Null | |
| 6,061,259 A | 5/2000 | DeMichele | |
| 6,275,395 B1 | 8/2001 | Inn et al. | |
| 6,320,363 B1 | 11/2001 | Oglesbee et al. | |
| 6,346,778 B1 | 2/2002 | Mason et al. | |
| 6,452,766 B1 | 9/2002 | Carper | |
| 6,486,616 B1 * | 11/2002 | Liu et al. | 315/291 |
| 6,573,693 B2 | 6/2003 | Okamoto | |
| 6,667,604 B2 | 12/2003 | Yanagisawa | |
| 6,674,248 B2 * | 1/2004 | Newman et al. | 315/291 |
| 6,710,546 B2 | 3/2004 | Crenshaw | 315/86 |
| 6,724,157 B2 | 4/2004 | Kazanov et al. | |
| 6,828,733 B1 | 12/2004 | Crenshaw | |
| 6,906,477 B2 | 6/2005 | Kazanov et al. | |
| 2003/0001516 A1 | 1/2003 | Newman | 315/224 |

FOREIGN PATENT DOCUMENTS

| | | |
|---|---|---|
| WO | WO 03/005550 | 1/2003 |

* cited by examiner

HIGH EFFICIENCY OFF-LINE LINEAR POWER SUPPLY

CROSS REFERENCE TO RELATED APPLICATIONS

This is a divisional of U.S. patent application Ser. No. 10/458,608, filed Jun. 10, 2003 in the name of Jamie P. Steffie, et al. and entitled HIGH EFFICIENCY OFF-LINE POWER SUPPLY, now U.S. Pat. No. 7,091,672.

BACKGROUND OF THE INVENTION

The present invention relates to power supplies. More particularly, the present invention relates to catear power supplies used to provide power to electronic circuits and which may receive their power across a circuit element disposed in a power line. For example, two wire lamp dimmers which are disposed in the hot side of an AC line are used to power lamp loads and vary the lamp intensity. The neutral line is provided directly to the lamp load and is not connected to the dimmer. In this way, a dimmer can be substituted for a single or multiple pole switch. The problem arises in such situations that if the dimmer includes additional circuitry, for example, control circuits or in some more complex systems, microprocessors and radio frequency circuits for transmitting and receiving control and status information, it is necessary to derive the power for those circuits solely from the hot line, since the neutral is not available. This can be done in a conventional way by providing a voltage dropping circuit in the hot line. However, this has a deleterious effect on the load and, in particular, would reduce the maximum brightness of the lamp connected to the dimmer.

The catear circuit was developed to draw current from the hot AC line in a two wire dimmer configuration. As shown in FIG. 2, in a conventional dimmer, a triac (not shown) is turned on at a particular point in the AC half cycle and turns off prior to the next zero crossing. FIG. 2 shows both the AC waveform (marked AC) and a full wave rectified version of the AC waveform wherein the negative going half cycles are inverted by a full wave rectifier. The inverted half cycle is marked DC in FIG. 2. In the first half cycle, the regions when the triac is typically off are shown at 1 and 3. The region marked 2 is when the triac is on. As well known, dimmers of this type are known as phase-control dimmers and the intensity of the lamp load is controlled by varying the cut-in point of the triac, thus varying the amount of power delivered to the load, and thus the intensity or brightness level of the lamp load. After the triac turns on (region 2), the voltage across the dimmer is substantially zero and it is difficult to obtain power from the dimmer itself at this time in the absence of any voltage dropping circuit, which, for the reasons discussed above, is undesirable. However, power can be taken from the AC line in the time period before the triac turns on (region 1) because at this point in time, the lamp is off. Similarly, power may be obtained from the AC line after the triac goes off before the next zero crossing (region 3). As shown in FIG. 2, the distinctive "catears" of regions 1 and 3 of the waveform shown both before the triac turns on and after it turns off, give the circuit its name. It is during these time periods, i.e., during the "catears" that power can be derived from the AC hot line without interfering with the dimmer operation.

FIG. 1 shows a conventional catear circuit. The catear circuit is wired to receive power from a rectifier circuit (RECT), for example, a full wave rectifier, which is wired across a portion of the dimmer circuit to receive rectified AC power. The rectifier provides current substantially only during the catear regions because when the triac of the dimmer circuit is on, there is substantially zero voltage across the dimmer. As shown in FIG. 1, a transistor Q206, which may be an FET, is turned on during the catear portions of the rectified AC, i.e., before the triac turns on and after the triac turns off again. The gate of transistor Q206 is provided with a voltage sufficient to turn it on via resistors R210, R212 and R220. When Q206 goes on, a charging capacitor C262 is charged via resistor R280 and diode D252. The output across capacitor C262 is provided to a voltage regulator circuit, for example, a linear regulator U203 which provides a substantially constant DC output to power the circuits connected thereto.

Accordingly, when the rectified line voltage is lower than a selected voltage, the charging transistor Q206 conducts to allow charging of the energy storage capacitor C262. The rate of charge of the capacitor is determined by resistor R280.

When the rectified line voltage exceeds a predetermined value, then transistor Q204 is turned on by the voltage divider formed by resistors R214, R221 and R276. When transistor Q204 turns on, which time can be set by voltage divider circuit comprising resistors R214 and R221 so that it is just prior to the time when the triac of the dimmer circuit turns on, the voltage at the collector of Q204 goes substantially to circuit common, thereby bringing the gate of Q206 substantially to circuit common and turning Q206 off so that Q206 stops charging capacitor C262 during the time when the triac is on.

Accordingly, capacitor Q262 is utilized as a charge storage element to charge up during the time prior to the triac turning on during the catear portion 1 of the rectified AC line voltage. During the time when the triac is on (region 2), power for the associated electronic circuits connected to the output of regulator Q203 is provided by the storage capacitor C262. When the triac turns off in region 3 of FIG. 2, the voltage at the base of Q204 will again be below its turn-on threshold and Q206 will again provide charging current to capacitor C262 during catear region 3.

In addition, a circuit comprising transistor Q252 is also provided to sense an overcurrent condition. Should an overcurrent be detected across resistor R280, transistor Q252 turns on, thus reducing the gate voltage of transistor Q206 to near zero and turning it off. In addition, a bus regulation circuit comprising zener diode D207 and resistor R275 is provided. If the voltage across storage capacitor C262 rises too high, the zener diode D207 will avalanche, raising the voltage across resistor R276 and turning on Q204 which will thus reduce the gate voltage to transistor Q206, turning it off. Accordingly, if C262 exceeds a predetermined voltage, Q206 will be turned off in that instance also to stop charging C262.

A problem arises with the conventional catear circuit in that its efficiency is impaired because transistor Q206 operates for a substantial portion of the time during the "catears" in its linear mode of operation, that is, it is not saturated. This is due to the drive voltage rising with the line, as well as other factors. It is thus turned on too slowly which causes the switching FET to operate in the linear region for much of the charging time, thereby dissipating power in the FET itself.

Accordingly, it is desirable to improve the prior art catear power supply circuit to improve its efficiency and, in particular, to improve its efficiency by ensuring that the switching device that charges the charging capacitor operates in its saturated region, thereby dissipating the least amount of power in the switching device and improving the overall efficiency of the catear power supply.

SUMMARY OF THE INVENTION

The above and other objects of the present invention are achieved by a power supply circuit comprising: a first switching device having a control terminal and a control terminal switching threshold, the first switching device charging current from a voltage source into a charge storage element, a control circuit controlling an on/off operation of the first switching device whereby the first switching device is turned on when the voltage of the voltage source is below a predetermined level and turned off when the voltage of the voltage source is above the predetermined level, a control voltage supply circuit providing a control voltage to the control terminal of the first switching device substantially in excess of the switching threshold in response to the control circuit when the voltage of the voltage source is below the predetermined voltage thereby to drive the switching device on in a saturated region of operation; and a charge storage element for providing an output voltage of the power supply.

It is desirable to drive the first switching device into saturation, whereby the voltage across the switching device is reduced beyond its voltage drop in the linear region of operation, thus increasing power supply efficiency.

The above and other objects are also achieved by a catear power supply circuit comprising a first switching transistor having a control terminal and a control terminal switching threshold, the first switching transistor charging current from a voltage source into a charge storage capacitor, a control circuit controlling an on/off operation of the first switching transistor whereby the first switching transistor is enabled to be turned on when the voltage of the voltage source is below a predetermined level and is turned off when the voltage of the voltage source is above the predetermined level, a control voltage supply circuit providing a control voltage substantially in excess of the switching threshold, the control voltage being supplied to the control terminal of the first switching transistor by the control circuit such that when the voltage of the voltage source is below the predetermined level, the control voltage is supplied to the control terminal of the first switching transistor thereby to drive the first switching transistor on in a saturated region of operation and when the voltage of the voltage source is above the predetermined threshold, the control voltage is not supplied to the control terminal, thereby turning the first switching transistor off; and a charge storage capacitor for providing an output voltage of the power supply.

The above and other objects are furthermore achieved by a lighting dimmer comprising an electronic lamp dimmer circuit providing power to a lamp load, a catear power supply coupled to the electronic lamp dimmer circuit for providing power to electronic circuits of the lighting dimmer, the catear power supply circuit comprising a switching device having a control terminal and a control terminal switching threshold, the switching device charging current from a voltage source into a charge storage element, a control circuit controlling the on/off operation of the switching device whereby the switching device is turned on when the voltage of the voltage source is below a predetermined level and turned off when the voltage of the voltage source is above the predetermined level, a control voltage supply circuit providing a control voltage to the control terminal of the switching device substantially in excess of the switching threshold when the voltage of the voltage source is below the predetermined level thereby to drive the switching device on in a saturated region of operation; and a charge storage element for providing an output voltage of the power supply.

The above and other objects are also achieved by a method of providing power to an electronic circuit in a two wire dimmer connecting a hot line of an AC network to a lamp load, the method comprising obtaining power from the two wire dimmer during regions of an AC waveform formed across a portion of a circuit of the dimmer when a phase cut switching device of the dimmer providing power to the lamp load is substantially off; driving a switching device providing charging current to a charge storage capacitor on in a saturated region of operation of the switching device when a voltage from a voltage source developed in the dimmer from the AC waveform is less than a predetermined level, and turning the switching device off when the voltage is above the predetermined level, and providing a voltage across the charge storage device as an output voltage.

Although the present invention is described herein for use with respect to lamp loads, the invention can also be used with other loads, e.g., motors and other loads. In addition, various lamps can be employed as loads, and the invention is not limited to incandescent lamp loads but may be used with fluorescent and other gas discharge lamps, without limitation. Further, the invention may be used in "non-dimmer" or other applications where both a hot and neutral are available.

Other features and advantages of the present invention will become apparent from the following detailed description of the invention which refers to the accompanying drawings.

BRIEF DESCRIPTION OF THE DRAWING(S)

The invention will now be described in greater detail in the following detailed description with reference to the drawings in which.

Figure 4:
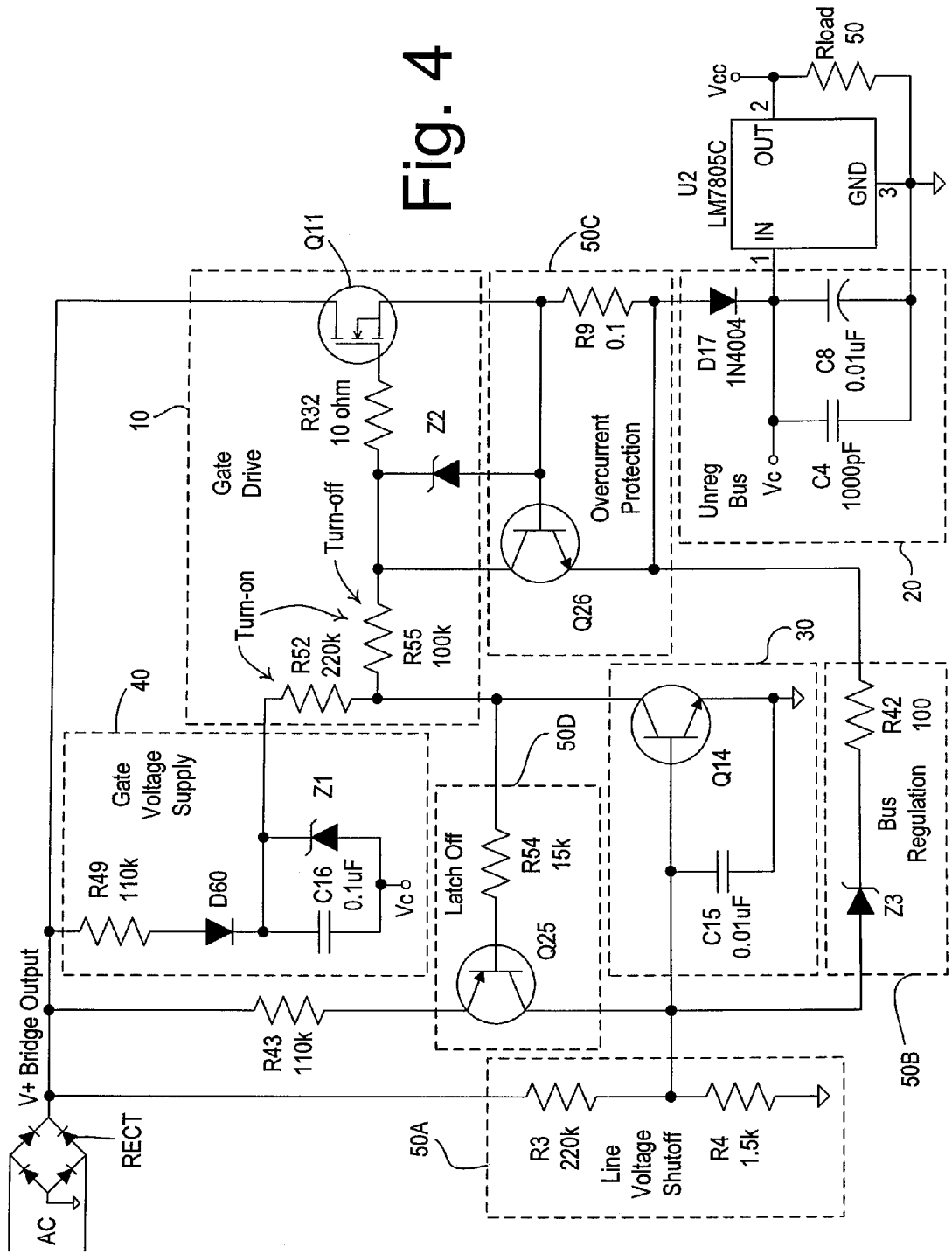

FIG. 4 is a schematic circuit diagram of the power supply according to the present invention; and FIGS. 5A-5E show the gate-drain voltage across the switching FET charging the storage capacitor, the voltage across the storage capacitor, the input current to the power supply and the gate voltage to the switching FET for respective load currents of 50 mA, 75 mA, 100 mA, 125 mA, and 150 mA with a 120 VAC input.

DETAILED DESCRIPTION OF THE EMBODIMENT OF THE INVENTION

Figure 1:
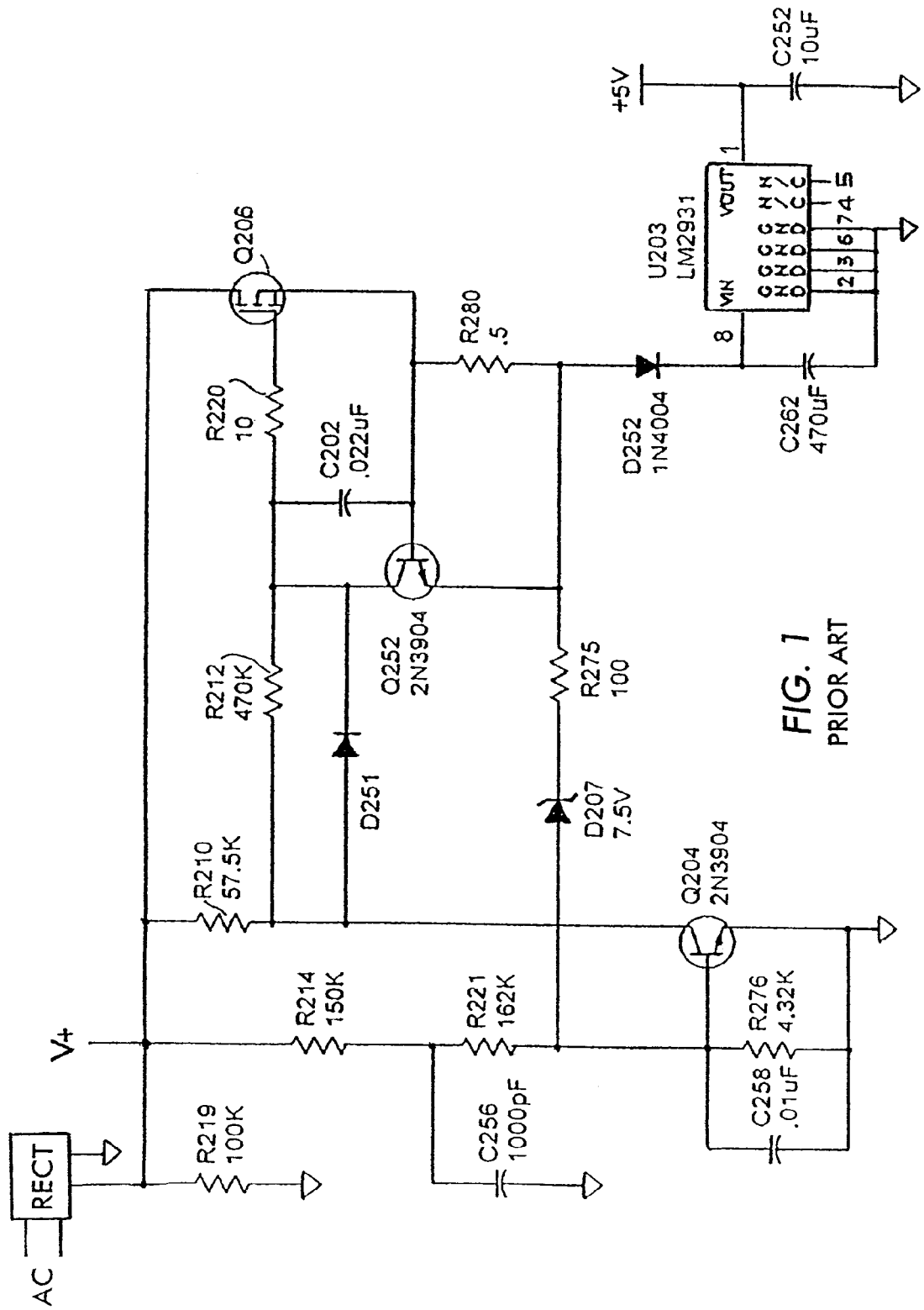
FIG. 1 shows a prior art catear power supply.
Figure 2:
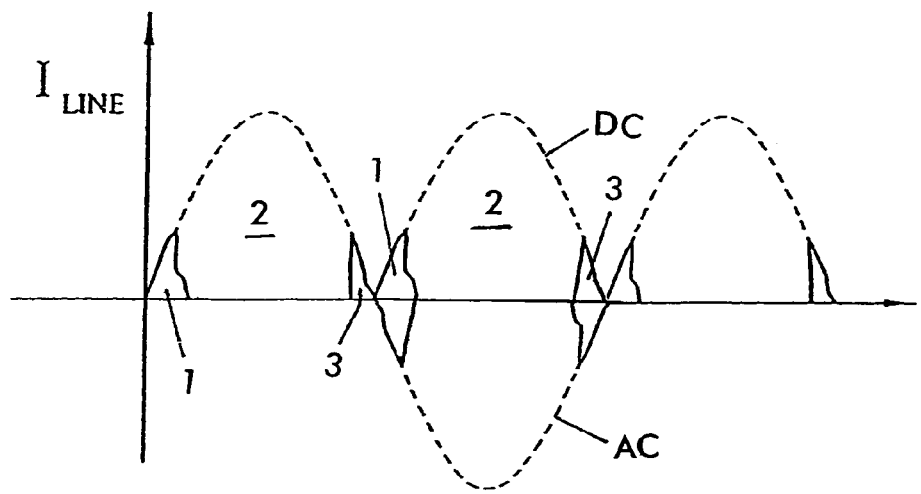
FIG. 2 shows both the rectified and unrectified AC line waveform showing the catear portions during which the triac is turned off.
Figure 2A:
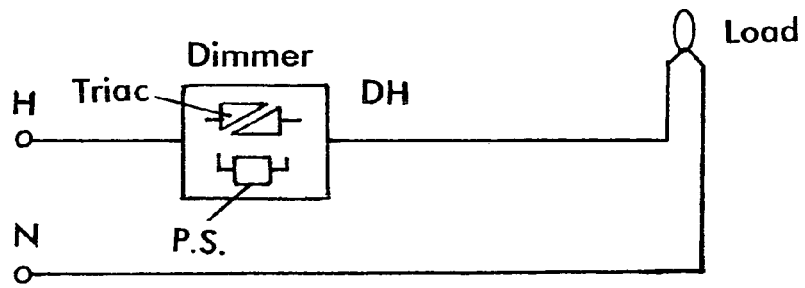
FIG. 2A shows schematically how the power supply of the present invention is disposed in a circuit including a two wire dimmer connected to a load and an AC network.

With reference to the drawings, FIG. 2A shows a dimmer incorporating the power supply (PS) according to the present invention. As shown, the dimmer includes a phase cut switching device. e.g., a triac, and its associated dimmer control circuitry as well known to those of skill in the art, as well as additional circuitry to be powered by the power supply. As shown in FIG. 2A, the dimmer is wired into the hot side (H) of the AC line and provides a dimmed hot (DH) output to the load comprising a lamp load. Although a lamp load is shown, the circuit could be employed with other loads, for example, a motor, in which case the speed of the motor is being controlled. As shown, the neutral (N) of the AC line is not connected to the dimmer so it is not possible to obtain power for the circuits in the dimmer directly across the AC line. Instead, as discussed above, the power supply (PS) must obtain its power across some portion of the dimmer circuit itself.

Figure 2B:
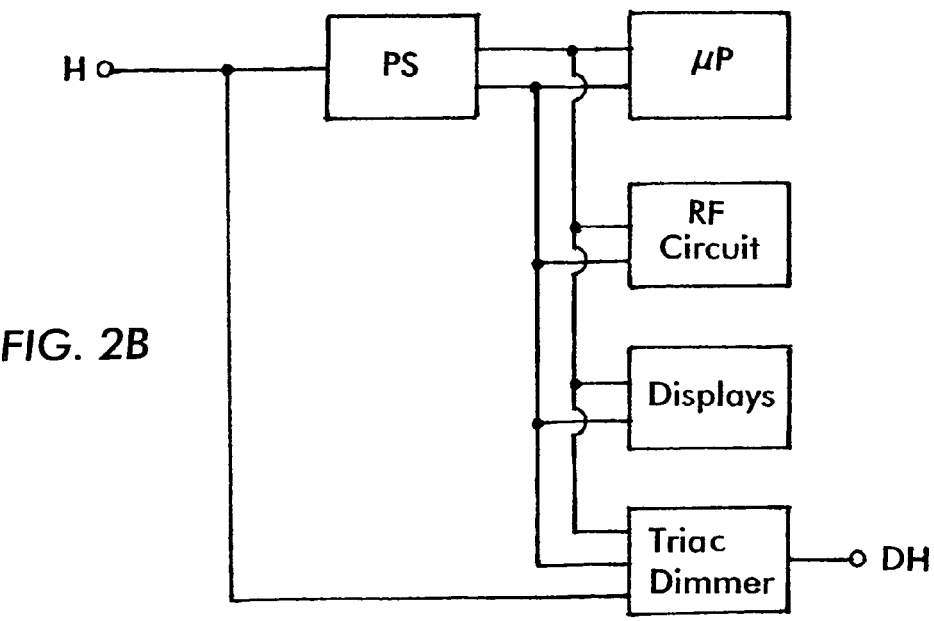
FIG. 2B shows the power supply of FIG. 2A and the electronic circuits of the dimmer which it powers.

FIG. 2B shows how the power supply of FIG. 2A is coupled to the hot AC line and provides power to various low voltage control circuits contained within the dimmer, for example, a microprocessor uP, an RF circuit, various displays and the triac dimmer circuit itself. For example, the power supply according to the present invention may be employed with dimmers that incorporate control circuits that receive and provide control and status information via radio frequencies. An example of such a system is the Lutron RF seeTouch® system and for less complex systems, the Lutron RadioRA® system. In both of these systems, lighting zones in various parts of a building can be controlled from a central or other locations via radio frequency signals.

Figure 3:
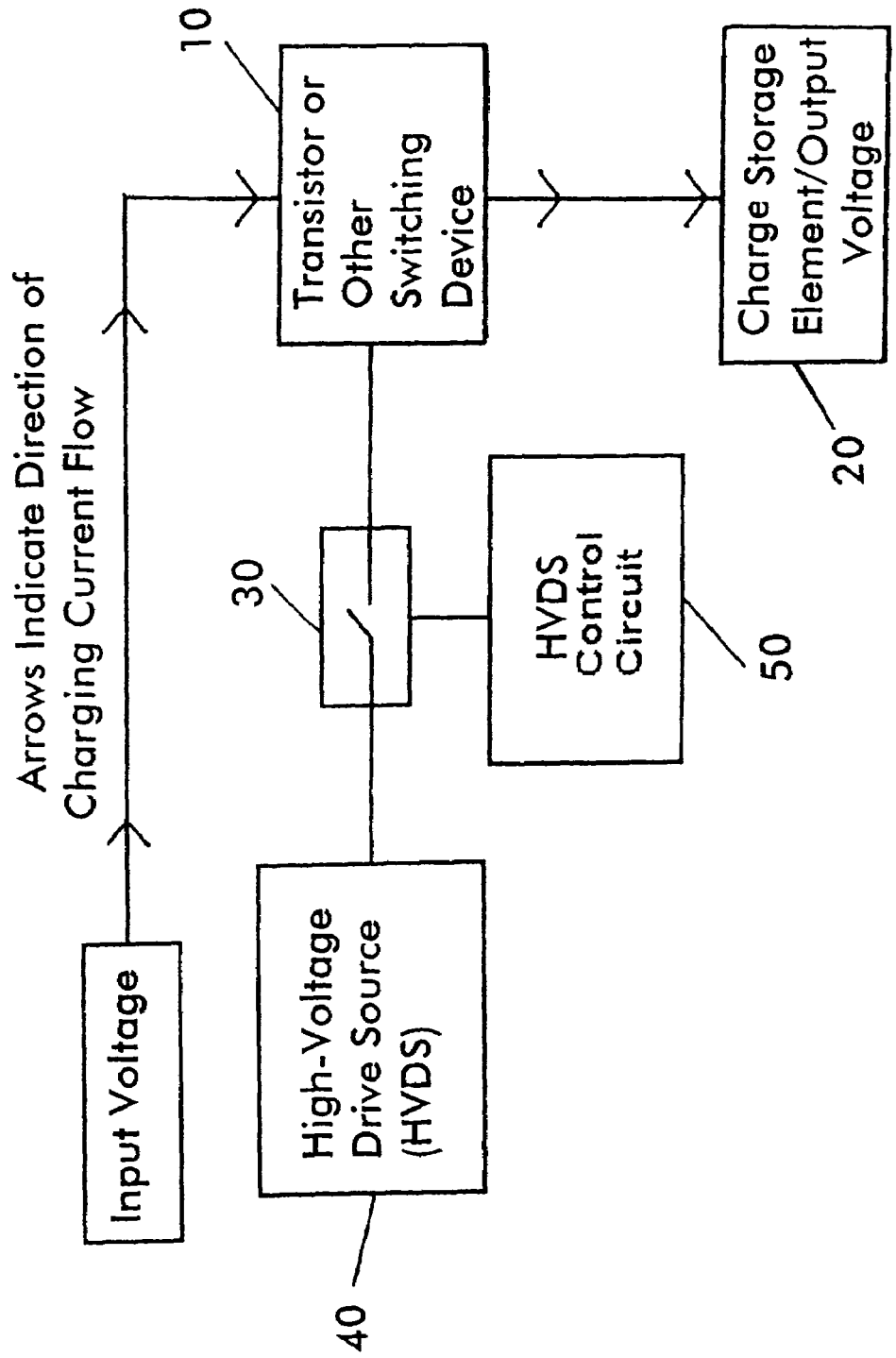
FIG. 3 is a block diagram of the power supply according to the present invention.

FIG. 3 is a block diagram of the power supply according to the invention. The circuit includes a switching device 10 coupled to a source of input voltage, a charge storage element 20 providing an output voltage, a control switching device 30 for controlling the on/off operation of the main switching device 10, a control voltage supply circuit comprising a high voltage drive source circuit 40 for driving the charging switch 10 into saturation when the switch 10 is controlled on, and a control circuit 50 for controlling the switching circuit 30 to control the on/off status of switching device 10.

Turning now to FIG. 4, a circuit diagram for the power supply according to the present invention is shown. Switching circuit 10 comprises a charge storage switching transistor such as an FET Q11 having its drain connected to a voltage source V+ and its source connected through a resistor R9 and diode D17 to a charging a charge storage capacitor C4 in the charge storage circuit 20. Voltage source V+ may be provided from a full wave rectifier bridge (RECT), as shown, connected across some portion of the dimmer. The gate of transistor Q11 is coupled through resistors R32, R55 and R52 to a high voltage drive source circuit 40. The high voltage drive source circuit 40 includes a high voltage drive source resistor R49, a high voltage drive source diode D60, a high voltage drive source capacitor C16 and a hiah voltage drive source zener diode Z1 connected as shown and coupled between the voltage source V+ and a power supply voltage Vc which is the voltage across storage capacitor C4 to ground. Illustratively, capacitor C16 may be 0.1 uf, resistor R49 may be 110 kohms and diode Z1 may be a 39 volt zener, so that a control voltage, i.e., approximately 40V, may be developed across C16.

The control circuit 50 comprises control circuit portions 50A, 50B, 50C and 50D. Portion 50A comprises a voltage divider comprising resistors R3 and R4. The voltage divider output is connected to the base of a transistor Q14, forming the switching circuit 30. Furthermore, the base of transistor Q14 is connected to circuit 50B which comprises a bus regulation circuit connected between the base of transistor Q14 and the anode of diode D17 connected in series with storage capacitor C4.

In addition, control circuit 50 also includes an overcurrent protection and current limiting circuit 50C and a latch circuit 50D.

The circuit operates as follows. Transistor Q11 charges capacitor C4 through resistor R9 and diode D17. Diode D17 prevents discharging of capacitor C4 when Q11 is off. The gate of transistor Q11 is provided with gate voltage via gate voltage supply circuit 40 and resistors R52, R55 and R32. Gate voltage supply circuit 40 is connected between voltage source V+ and voltage Vc across capacitor C4. Since the voltage across C4 is substantially lower than the voltage on the bus V+, capacitor C16 in circuit 40 immediately begins to charge via resistor R49 and diode D60 as the rectified AC voltage increases during the catear region 1 of FIG. 2. Zener diode Z1 limits the voltage across the capacitor C16 and ensures that the capacitor C16 charges quickly because it acts as a current divider drawing current from V+ to quickly reach its avalanche voltage. Capacitor C16 charges quickly through diode D60 and resistor R49, and the voltage across capacitor C16 plus the voltage across capacitor C4 is provided to the gate of transistor Q11 via resistors R52, R55 and R32, driving transistor Q11 into the saturated region very quickly. As an exemplary embodiment, the gate voltage provided to transistor Q11 may be approximately 15 volts, thus quickly driving transistor Q11 into saturation. A zener diode Z2 is provided to prevent the gate voltage from exceeding a predetermined safe level to protect FET Q11, for example, to maintain the gate voltage below about 25 volts.

Diode D60 prevents discharge of capacitor C16 when voltage V+ drops to near zero when the triac turns on.

Once transistor Q11 goes on, it is in its saturated region and the capacitor C4 is charged with minimal loss in transistor Q11. The charged voltage across capacitor C4 is provided to a voltage regulator U2, for example, a conventional linear regulator, similarly as in the prior art, and the output of U2 is provided to power the various electronic circuits.

Transistor Q14 performs the function of switch 30 in the block diagram of FIG. 3. As soon as the voltage V+ exceeds a predetermined level, Q14 is turned on (the triac turns on at some time thereafter), thus driving the gate of Q11 low via resistors R55 and R32, and turning Q11 off, preventing charging during the period of time when the dimmer triac turns on, thereby preventing drawing current away from the dimmer and lamp load during this time.

Transistor Q14 is turned on by the voltage divider circuit 50A comprising resistors R3 and R4.

In addition, circuit 50D includes a latch circuit comprising transistor Q25. In the circuit shown, the transistor Q25 is a PNP transistor. Q25 functions to latch transistor Q14 on and therefore the FET Q11 off. When Q14 is turned on by the V+ bus voltage exceeding a predetermined level, the collector voltage of Q14 drops. The collector of Q14 is connected to the base PNP transistor Q25 by resistor R54. When the collector of Q14 drops, Q25 turns on thereby increasing the voltage drop across resistor R4 thus ensuring that transistor Q14 latches on.

After the triac of the dimmer turns on, the voltage on bus V+ drops substantially to zero, so no charging current is delivered to the charge storage capacitor C4 during this time, which corresponds to region 2 of FIG. 2.

Circuit 50 also includes circuit 50B which comprises a bus regulation circuit. Should the voltage across capacitor C4 increase above a preset level, zener diode Z3 avalanches, thereby increasing the voltage across the resistor R4 and turning transistor Q14 on. This could occur, for example, during the catear portions of the input waveform (regions 1 and 3 of FIG. 2) when capacitor C4 is charging should the charging voltage across capacitor C4 increase to levels above a predetermined voltage.

Circuit 50 also includes an overcurrent protection and current limiting circuit 50C. Resistor R9 limits the current through the FET at all times. In addition, transistor Q26 is connected to resistor R9 such that should the voltage across resistor R9 exceed the threshold of Q26, transistor Q26 will turn on thereby driving the gate of transistor Q11 toward its source and turning transistor Q11 off in the event of an overcurrent.

Once the triac of the dimmer turns off, the voltage across bus V+ is determined by the catear waveform of region 3 of FIG. 2, and, as soon as the voltage V+ drops below a certain level so that voltage divider 50A provides a voltage insufficient to keep transistor Q14 on, Q14 turns off, thus turning on Q11 and again charging current into capacitor C4 during catear region 3 of FIG. 2.

The present invention thus provides a power supply of the catear type which is highly efficient because losses in the switching device charging the charge storage element are reduced by ensuring that the switching device, when on, is operating in its saturated region. In contrast, prior art catear topologies turn the switching device on in dependence on the AC line voltage which dissipates considerably more energy since the FET is not saturated but instead operating in its linear region. The present invention provides for FET saturation at low line voltages, which leads to greater efficiency.

Another advantage of the present circuit over other possible power supply circuits is that the switching device operates at a low frequency. In contrast, prior art switching power supplies operate at high frequencies creating substantial RF noise which can interfere with RF control circuits with which the present invention can operate as well as generally radiating substantial EMI which must be shielded or otherwise reduced.

Figure 5A:
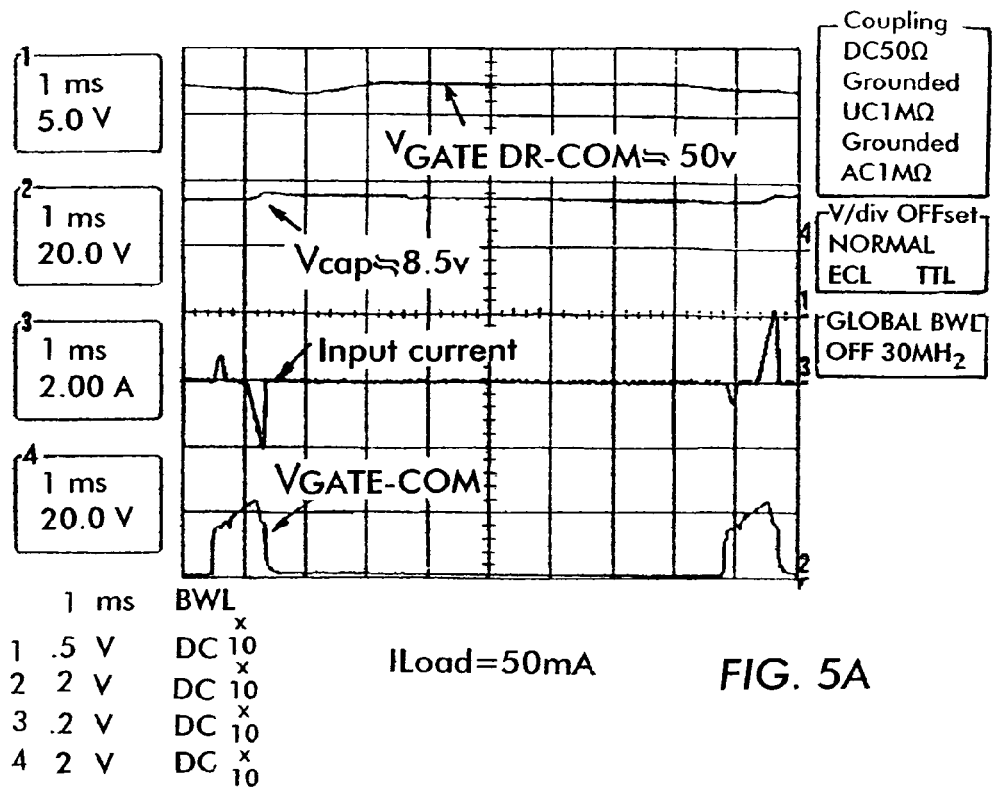
Figure 5B:
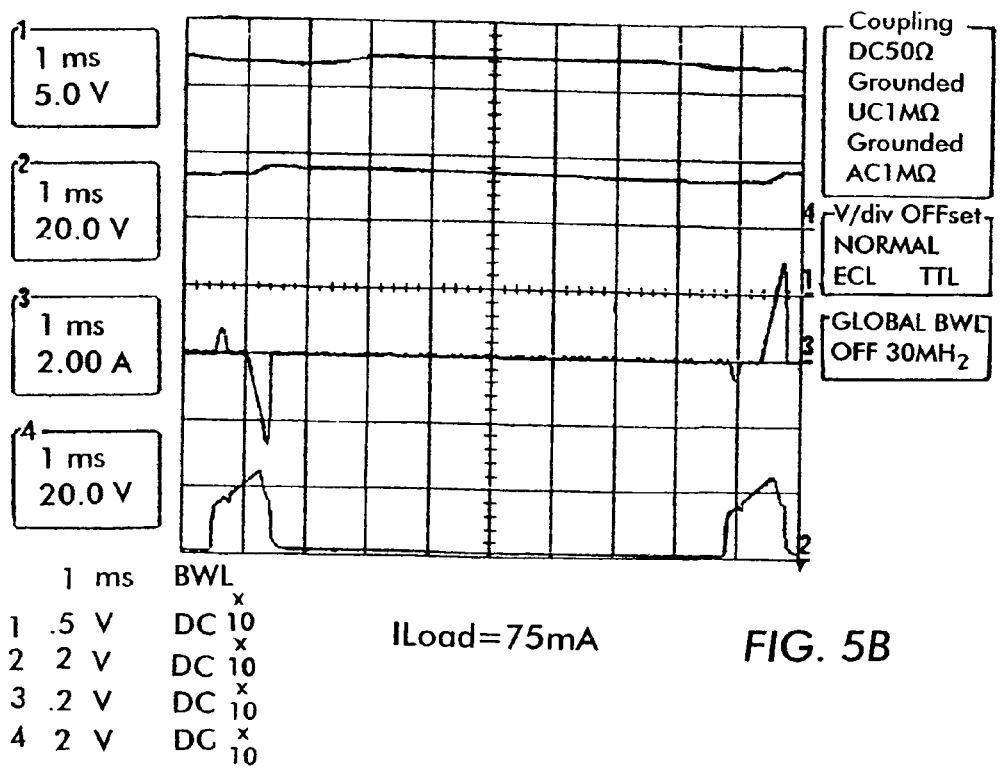
Figure 5C:
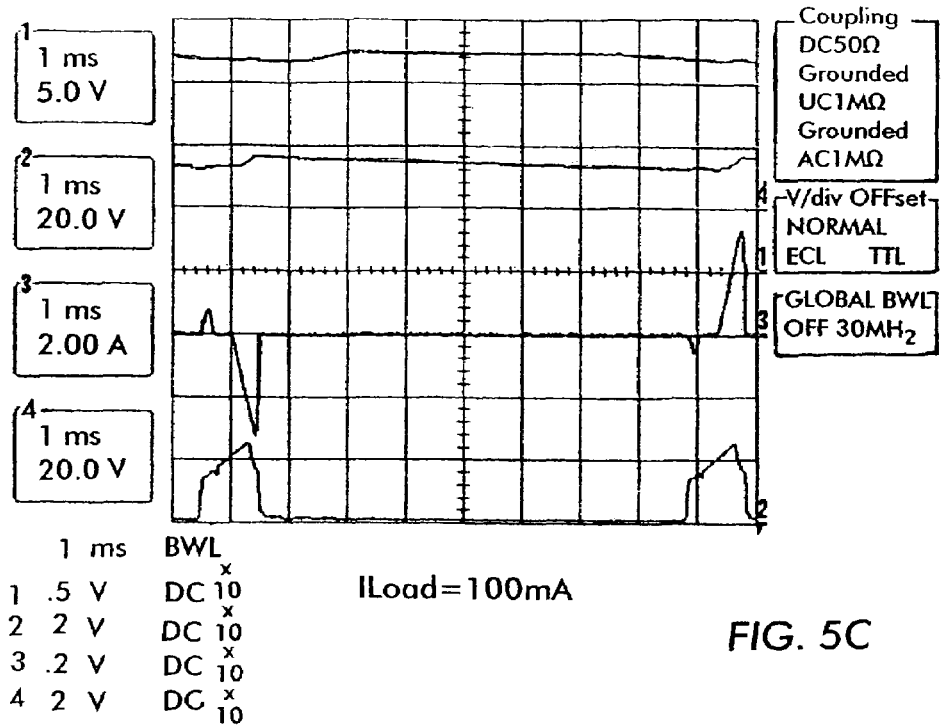
Figure 5D:
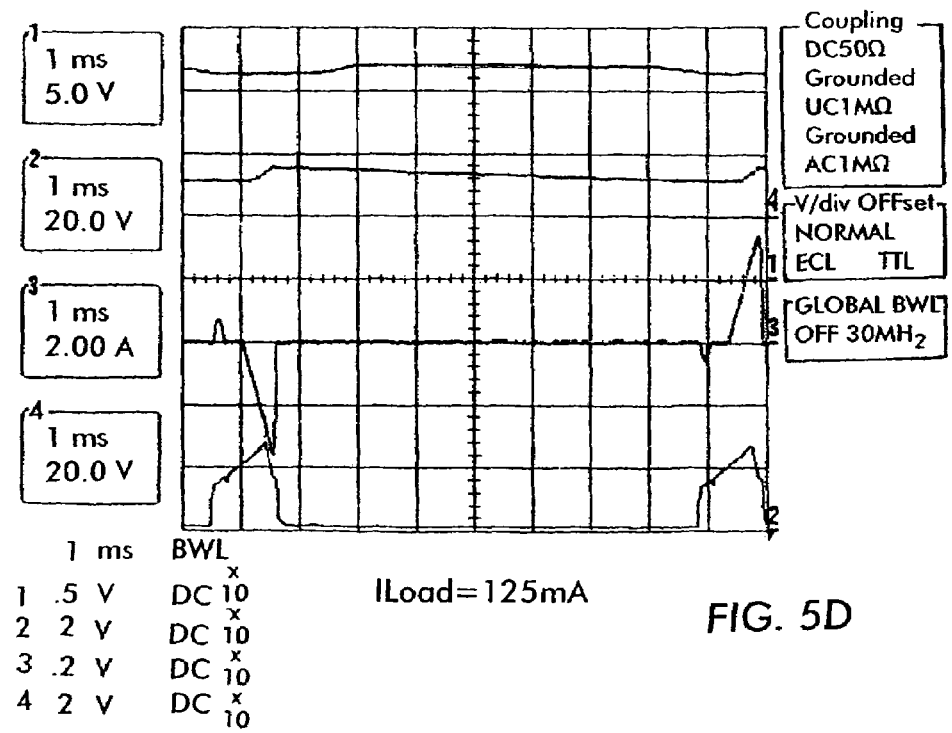
Figure 5E:
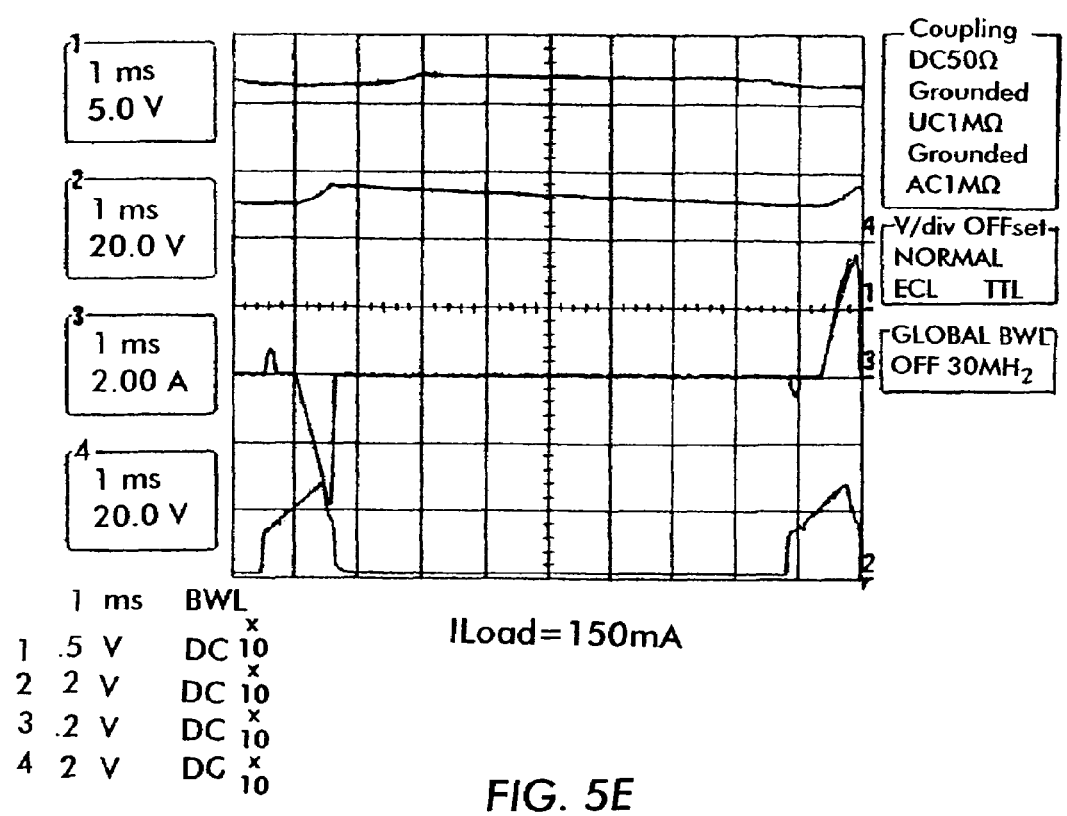

FIGS. 5A-5E show waveforms of the gate-drain voltage across FET Q11, the voltage across capacitor C4, the input current into the rectifier and the gate voltage of FET Q11 measured between the gate and the circuit common ground connection. Each waveform is based upon a network voltage of 120 volts AC. FIG. 5A is for a load current of 50 mA; FIG. 5B shows the waveforms for a load of 75 mA; FIG. 5C shows the waveform for a load of 100 mA; FIG. 5D shows the waveforms for a load of 125 mA; and FIG. 5E shows the waveforms for a load of 150 mA.

As can be seen from the waveforms, the gate waveform to transistor Q11 has a very sharply defined rising edge with the voltage rising quickly to about 15 volts, thus driving the FET Q11 into saturation very quickly. The gate voltage rises high enough to turn the FET on quickly into saturation. The V+ voltage bus ranges from about 50 volts down to about 45 volts. The capacitor bus voltage across capacitor C4 ranges between 8.5 to 7.5 volts at 150 mA load and the input current essentially follows the line current.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method of generating a power supply voltage in a two wire dimmer having a phase cut switching device adapted to be coupled between a hot side of an AC line and a lamp load for providing power to the lamp load, the method comprising the steps of:

receiving an AC waveform from the hot side of the AC line;

charging a charge storage capacitor from the AC line through a charge storage switching device during regions of the AC waveform when the phase cut switching device is substantially off to generate the power supply voltage across the charge storage capacitor;

generating a control voltage across a high voltage drive source capacitor;

providing the control voltage to a control electrode of the charge storage switching device to drive the charge storage switching device on in a saturated region of operation when a magnitude of the AC waveform is less than a predetermined level; and turning the charge storage switching device off when the AC waveform is above the predetermined level; and providing the power supply voltage across the charge storage capacitor as an output voltage.

2. The method of claim 1, wherein the step of generating a control voltage across a high voltage drive source capacitor comprises rectifying the AC waveform to produce a rectified voltage, providing the rectified voltage to charge the high voltage drive source capacitor, and limiting the control voltage across the high voltage drive source capacitor.

3. The method of claim 1, further comprising the step of:

regulating the output voltage across the charge storage capacitor.

4. The method of claim 1, wherein the control voltage is about 15 volts.

5. The method of claim 1, wherein the control voltage is limited to less than about 25 volts.

6. The method of claim 1, further comprising the step of:

turning off the charge storage switching device in the event of an overcurrent through the charge storage switching device.

7. The method of claim 1, further comprising the step of:

turning off the charge storage switching device if the power supply voltage exceeds a predetermined level.

8. The method of claim 1, further comprising the step of:

latching the charge storage switching device on after the charge storage switching device is driven on in the saturated region of operation when the magnitude of the AC waveform is less than the predetermined level.

9. A method of generating a power supply voltage in a two wire dimmer having a phase cut switching device adapted to be coupled between a hot side of an AC line and a lamp load for providing power to the lamp load, the method comprising the steps of:

receiving an AC waveform from the hot side of the AC line;

charging a charge storage capacitor from the AC line through a charge storage switching device during regions of the AC waveform when the phase cut switching device is substantially off to generate the power supply voltage across the charge storage capacitor;

generating a control voltage substantially in excess of a control terminal threshold voltage of the charge storage switching device;

providing the control voltage to a control electrode of the charge storage switching device to drive the charge storage switching device on in a saturated region of operation when a magnitude of the AC waveform is less than a predetermined level;

turning the charge storage switching device off when the AC waveform is above the predetermined level; and providing the power supply voltage across the charge storage capacitor as an output voltage.

10. The method of claim 9, wherein the control voltage is about 15 volts.

11. The method of claim 9, wherein the control voltage is less than about 25 volts.

12. The method of claim 9, further comprising the step of:

regulating the output voltage across the charge storage capacitor.

13. The method of claim 9, further comprising the step of: turning off the charge storage switching device in the event of an overcurrent through the charge storage switching device.

14. The method of claim 9, further comprising the step of: turning off the charge storage switching device if the power supply voltage exceeds a predetermined level.

15. The method of claim 9, further comprising the step of: latching the charge storage switching device on after the charge storage switching device is driven on in the saturated region of operation when the magnitude of the AC waveform is less than the predetermined level.

* * * * *